United States Patent
Bischoff et al.

(10) Patent No.: US 6,512,860 B2
(45) Date of Patent: Jan. 28, 2003

(54) BENT ELECTRO-ABSORPTION MODULATOR

(75) Inventors: Svend Bischoff, Fredensborg (DK); Peter M. W. Skovgaard, Birkerød (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 09/931,386

(22) Filed: Aug. 17, 2001

(65) Prior Publication Data

US 2002/0131664 A1 Sep. 19, 2002

Related U.S. Application Data

(60) Provisional application No. 60/266,124, filed on Aug. 18, 2000.

(51) Int. Cl.[7] .............................................. G02F 1/035
(52) U.S. Cl. ............................. 385/2; 385/8; 385/132; 385/32
(58) Field of Search ......................... 385/2, 8, 32, 132

(56) References Cited

U.S. PATENT DOCUMENTS

| | | | |
|---|---|---|---|
| 4,810,049 A | | 3/1989 | Fischer et al. |
| 5,917,637 A | | 6/1999 | Ishikawa et al. |
| 5,930,412 A | * | 7/1999 | Toussaere ..................... 385/3 |
| 6,088,500 A | | 7/2000 | Zmudzinski et al. |
| 6,215,917 B1 | * | 4/2001 | Takahashi et al. .......... 359/173 |
| 6,243,525 B1 | | 6/2001 | Luizink et al. |

FOREIGN PATENT DOCUMENTS

| | | |
|---|---|---|
| CA | 2261520 | 8/1999 |
| EP | 0 285 351 B1 | 6/1995 |
| EP | 0 718 668 A2 | 6/1996 |
| JP | 11-167032 | 6/1999 |
| JP | 11-183742 | 7/1999 |
| JP | 11-271550 | 6/2001 |

OTHER PUBLICATIONS

Veldhuis et al., "Integrated optic intensity modulator based on a bent channel waveguide," Optics Communications, vol. 168, Sep. 15, 1999, pp. 481–491.

Yip et al., "Quantum Well P–I–N Devices on InAsP/InP," http://lisa.polymtl.ca/LISA–Brochure/Qu.Well–p32.html, May 31, 2000.

\* cited by examiner

*Primary Examiner*—Hung N. Ngo
(74) *Attorney, Agent, or Firm*—Birch, Stewart, Kolasch & Birch, LLP

(57) ABSTRACT

The present invention relates to a method and a device for modulating optical signals based on modulating bending losses in bend, quantum well semiconductor waveguide sections. The complex refractive index of the optical active semiconducting components of the waveguide section is modulated by applying a variable electric or electromagnetic field. The modulation of the complex refractive index results in a modulation of the refractive index contrast and the absorption coefficient for the waveguide at the frequency of the light. By carefully adjusting the composition of the semiconducting components and the applied electric field in relation to the frequency of the modulated radiation, the bending losses (and possibly coupling losses) will provide extinction of light guided by the bent waveguide section. The refractive index contrast may be modulated while keeping the absorption coefficient substantially constant and small, whereby the guided light can be modulated only by bending losses. Alternatively, the invention may be applied to enhance the extinction ratio of existing absorption modulators such as Electro-Absorption Modulators (EAMs) in which case extinction by absorption and extinction by bending losses co-operates to provide more compact modulators with improved performance (extinction) and speed.

16 Claims, 5 Drawing Sheets

BENT ELECTRO-ABSORPTION MODULATOR

This application claims the benefit of 60/266,124, filed Aug. 18, 2000.

FIELD OF THE INVENTION

The present invention relates to a method and a device for modulating optical signals based on modulation of the absorption and of the bending losses in bend, quantum well semiconductor waveguide sections. The complex refractive index of the optical active semiconducting components of the waveguide section is modulated through the Quantum Confined Stark Effect (QCSE), by applying a variable electric or electromagnetic (EM) field. The modulation results in a modulation of the effective refractive index contrast and the absorption coefficient for the waveguide at the frequency of theoretical signal.

BACKGROUND OF THE INVENTION

In optical communication it is often of interest to obtain a high bit rate in the optical signals, the improvement of the present standards of 10 Gbit/s being restrained by the modulation speed of optical modulators. Typically, two classes of optical modulators are used, interferometric devices such as Mach-Zehnder type modulators and Electro-Absorption Modulators (EAMs).

Mach-Zehnder modulators utilise optic active materials to control a phase shift between two arms in an interferometer whereby the resulting signal may be modulated. Mach-Zehnder modulators presently provide modulation speeds up to 40 Gbit/s, however, 100 Gbit/s have been reported. It is a disadvantage of Mach-Zehnder modulators that they are typically large, expensive, and require a large voltage amplitude to produce the required phase shift.

In EAMs, a modulated absorption coefficient is induced in active semiconductor materials using a modulated electric field, i.e. utilising QCSE. There are two characteristic energy regimes for a semiconductor material, being denoted as below bandgap and above bandgap, where the absorption coefficient (proportional to the imaginary part of the refractive index) of the semiconductor material is zero or non-zero, respectively. This is shown schematically in FIG. 1 where the curves show no absorption at low energies/frequencies below bandgap and high absorption at high energies/frequencies above bandgap. The boundary between these two regimes, i.e. the bandgap region where the curves rise steeply, can be shifted due to the Quantum Confined Stark Effect (QCSE) when the material comprises a Quantum Well semiconductor structure. This is also shown in FIG. 1, where the absorption (i.e. the imaginary part of refractive index) are shifted to lower energies/lower frequencies when a reverse bias is applied. The QCSE in bulk structures is denoted the Franz-Keldysh Effect (FKE). The QCSE is observed when reverse biasing the semiconductor structure. The amount of absorption near the bandgap is thereby increased for increasing reverse bias. Thereby, the optical absorption may be modulated between a low and a high value for light in a narrow energy/frequency region as indicated by the shadowed region 2 in FIG. 1. The change in the absorption due to the QCSE or FKE is the mechanism used in EAMs. Presently, EAMs can provide modulations speeds up to 40 Gbit/s.

In an article by Veldhuis et al, Optics Communications, 168 (1999) 481, an optic intensity modulator based on a bent channel waveguide is disclosed. The bent channel waveguide has a fixed bending radius . When the lateral refractive index contrast between the core and the cladding material is high enough, all the light in the waveguide will be guided. If the lateral refractive index contrast is lowered sufficiently, part of the light will be radiated out of the waveguide, the exact fraction depending on the value of the contrast. By adjusting the contrast, the precise transmitted power may be controlled. FIG. 6 summarises the length and changes $\partial n_{act}$ in the refractive index of the core, assuming constant cladding index, required to achieve a 30 dB extinction. Veldhuis et al proposes the use of thermo-optic or electro-optic actuation for controlling the refractive index in thermo-optic or electro-optic polymers applied in NxM matrix switches to decrease cross-talk and increase compactness.

SUMMARY OF THE INVENTION

It is an object of the present invention to provide a device and a method for modulating electromagnetic (EM) radiation, which provide an enhanced extinction ratio and faster operation than conventional modulators.

It is another object of the present invention to provide a device and a method for modulating EM radiation, which provides more compact modulators than conventional modulators.

It is a further object of the present invention to provide a device and a method for modulating EM radiation, which requires smaller voltage swings than conventional modulators.

The response of an optical active semiconductor material to an EM field (light) is governed by the complex refractive index of the semiconductor material, generally denoted as n=Re(n)+i Im(n). The imaginary part Im(n) determines the amount of light, which will be absorbed in the semiconductor material, while the real part Re(n) of the refractive index determines the speed of light in the medium. The refractive index is a function of frequency and the amount of absorption hence depends on the frequency (or wavelength) of the light.

The lateral confinement of light in typical waveguides is based on total internal reflection. Total internal reflection is the reflection of EM radiation from the interface of a medium with larger index of refraction $n_1$ with a medium of smaller index of refraction $n_2 < n_1$ when making an angle of incidence T! sin $^1$ $$\frac{n_2}{n_1}$$

to normal. Thus, the lateral confinement of light depends upon the index contrast between the waveguide core and the surrounding material as well as upon the angle of incidence of light on the boundaries between the waveguide core and the surrounding material. Hence a change in the index contrast may, depending on the angle of incidence, introduce losses du to lack of total internal reflection. Also, varying the direction of the lateral confinement parts or side walls will change the angle of incidence and may, depending on the index contrast, introduce large losses due to lack of total internal reflection. Variations in the direction of the lateral confinement parts may be a bent waveguide if both sides of the lateral confinement vary identically. It may also be a variation of only one of the sides such as a narrowing of the waveguide. Alternatively, the width of the waveguide may vary in that both sides performs repeated change of directions, such as a wobbling. All these different scenarios will introduce losses since they change the angle of incidence on at least one side of the lateral confinement boundary of the waveguide, the collective term bending losses will be used for simplicity.

The present invention provides an optical intensity modulation by introducing a modulated loss governed by a modulation of the real part of the refractive index. The invention may be implemented as an optical modulator based on these modulated losses alone, or may be used to improve the performance of existing optical modulators by introducing an extra loss for improving the extinction ratio. A modulation of the real part of the complex refractive index can be accomplished in different ways, however, in order to obtain modulation speeds fast enough for industrial application in optical communication and related fields, the working principle and material composition of devices must be carefully considered. The present invention will provide more compact optical intensity modulators with improved performance (extinction) and speed.

It is known from prior art electro-absorption modulators to use QCSE to obtain a modulation in the absorption (or equivalently the imaginary part of the refractive index). The modification of the refractive index, shifted due to the QCSE in case of a quantum well semiconductor structure comprising an optical active semiconducting material core, is not only restricted to the imaginary part of the refractive index. Also the real part of the refractive index will be modified. The change of the real part can be calculated from the changes in the imaginary part of the refractive index by the Kramers-Kronig transformation. In general, QCSE provides a very fast and precise variation of the real part of the refractive index, however, the QCSE can only change the real part a small amount (the effective refractive index can be changed on the order of a few $10^{-3}$). Thus, the effective refractive index contrast as well as the bandgap frequency of the bandgap is modulated by the electrical field applied to induce QCSE, also referred to as the voltage swing or $\partial V$.

The complex refractive index modulations may also be induced by photo generated charge carriers. In this case, the modulation of the complex refractive index is a result of different effects following from the absorption of an EM field such as an intensity modulated optical control signal. The control signal should have a frequency above the bandgap of the optical active semiconducting material in order to be absorbed and generate free charge carriers in the material. If the optical active semiconducting material core is electrically biased, the photo-induced free charge carriers will screen the bias field and thereby modulate the bandgap energy according to the QCSE, hence the term optically induced QCSE. Furthermore, the photo-induced free charge carriers affect the complex refractive index of the material, resulting in the desired index modulations.

The present invention fulfil the objects given above by, in a first aspect, providing an optical modulator for modulating electromagnetic (EM) radiation having a first frequency $\Theta_1$, said optical modulator comprising a first waveguide section for guiding the EM radiation, said waveguide section comprising an elongated core region with complex refractive index $n_{core}$ having side walls to a surrounding region with complex refractive index $n_{surr}$, the difference between the real part of $n_{core}$ and the real part of $n_{surr}$ defining a refractive index contrast $\partial n = \text{Re}(n_{core}) - \text{Re}(n_{surr})$ and at least one of the side walls of the core region being in the longitudinal direction of the core region, and comprising means for applying a modulated first and second electric or EM field $E_1$ and $E_2$ to the core region, wherein the core region comprises an optical active semiconducting material having a predetermined material composition and having an energy bandgap, said energy bandgap being positioned at a first bandgap frequency $\Theta_{bandgap\ E1}$ in response to the application of the first field and being positioned at a second bandgap frequency $\Theta_{bandgap\ E2}$ in response to the application of the second field, $n_{core}$ depending upon the energy bandgap so that the material composition provides, for EM radiation of the first frequency, a first complex refractive index $n_{core\ E1}$ in response to the application of the first field and a second complex refractive index $n_{core\ E2}$ in response to the application of the second field, and wherein the predetermined material composition and the first frequency are chosen so that a difference in the index contrasts $\partial n_{E1} = \text{Re}(n_{core\ E1}) - \text{Re}(n_{surr})$ and $\partial n_{E2} = \text{Re}(n_{core\ E2}) - \text{Re}(n_{surr})$ results in bending losses for EM radiation of the first frequency guided in the waveguide.

Thus, according to the first aspect, the index contrast for a waveguide section having an optical active semiconducting material core may be modulated electronically or optically. If at least one side of the lateral confinement boundary of the waveguide is bend, the modulation of the index contrast will result in losses due to lack of total internal reflection. Naturally, the bend must be in the longitudinal direction of the core region so as to intercept the straight propagation of light in the waveguide. These losses may efficiently improve the performance of existing absorption-modulators as described in the following.

As mentioned previously, QCSE can only change the real part of the refractive index of an optically active semiconductor material a small amount, typically on the order of a few $10^{-3}$, similarly, the shift in the index contrast due to QCSE induced by the applied fields will be correspondingly small resulting in a small extinction due to bending loss modulation. Thus, in order to induce high extinction ratios in the modulated bending losses, the waveguide index contrast should be small at least in directions in the plane of the bend (transverse directions). Therefore, the index contrast between the core region and the surrounding regions in the lateral direction is preferably equal to or smaller than a few $10^{-2}$ such as equal to or smaller than a few $10^{-3}$.

By modulating the bandgap frequency of the bandgap of an optically active semiconductor material, the absorption coefficient will also be modulated whereby some absorption will occur in the material. However, the absorption of the EM radiation generates free charge carriers in the active material. These free charge carriers may screen the applied electrical field and are a part of the circuit performing the modulation, hence, the transporting of these free charge carriers will effectively limit the modulation speed. At high light intensities, the generated free charge carriers may ultimately saturate the circuit performing the modulation.

However, since the radiation in the waveguide will experience large bending losses as well, the amount of absorbed photons will be reduced, thereby also reducing the generation of free charge carriers. Thus, by combining the absorption modulation scheme with bending losses, the combined extinction from absorption and bending losses will increase the obtainable modulation speed and extinction. The combined extinction from absorption and bending losses will enhance the extinction ratio of the modulator for a given amplitude in the applied fields, voltage swing if an electrical signal is applied and modulation depth if an EM signal is applied.

As mentioned in the above, in order to induce high extinction ratios in the modulated bending losses, the waveguide index contrast should be small at least at positions where the bending losses is supposed to take place.

Therefore, the waveguide type is preferably a weakly index guided waveguide such as a ridge waveguide or a Buried Heterostructure (BH) waveguide. The waveguide typically comprises a number of different material layers deposited on a substrate, the different layers forming a structure which define the core region in one transverse (typically vertical) direction. At least one of the material layers forming the core region is an optically active semiconductor material meaning that it has an energy bandgap above which the material can absorb photons.

The means for applying the fields are preferably one or more electrical contacts for forming an electric field, the contacts being formed by one or more electrically conducting material layers deposited on the waveguide structure. Forming and contacting such contacts are well known techniques within the field of planar waveguides.

Alternatively, the applied field is an EM field. In this case, the means for applying the first and second fields comprises one or more optical input ports for receiving an EM signal of a second frequency and means for guiding said signals to the core region. The optical active semiconducting material and the second frequency of the EM radiation should be chosen so that the radiation is absorbed.

In one preferred type of waveguides, the horizontal transverse boundaries are defined by an electric field applied over only part of the active layer so as to induce an index contrast in horizontal transverse direction of the active layer. Alternatively, the core region is defined in the horizontal transverse by a material region having a slightly different refractive index. Optionally, the lateral confinement is provided by a combination of these effects.

As can be seen from FIG. 1, the bandgap is not defined by a single frequency, rather there is an energy boundary region wherein the absorption increases for increasing energies. By choosing a given absorption within this boundary region, it is possible to define corresponding bandgap frequency, $\Theta_{bandgap}$, at which the bandgap starts, and above and below which one refers to above bandgap or below bandgap. It is important to stress that the bandgap frequency can be chosen anywhere in the boundary region, and since one often works in the boundary region, a frequency being higher than the bandgap frequency simply means that light having this frequency experiences a higher absorption than light having a frequency lower than the bandgap frequency. Hence a given frequency in the boundary of FIG. 1 may be above bandgap in a first situation (where it is compared to an even lower frequency experiencing a smaller absorption) whereas it will be below bandgap in another case (compared to a slightly higher frequency experiencing a higher absorption). Therefore, it is generally not possible to assign a specific bandgap frequency to one of the curves in FIG. 1, as it depends on the specific situation.

Preferably, the bending losses are introduced by applying a bent waveguide section. Alternatively, the waveguide is designed so that at least one of the side walls is bent so as to vary the width of the waveguide. Such design will also introduce bending losses due to the many small bends in the sections. Also, different types of bending losses may be combined.

The combination of absorption and bending losses enhance the extinction ratio for a given amplitude of the applied field. The effect that the bending losses reduce the amount of free charge carriers leads to a number of advantages, most important an increased modulation speed and reduced tendency for the free charge carriers to saturate the modulation circuit. These effects make the modulator more efficient which allows a decrease in the size of the modulator while keeping the efficiency (extinction ratio) constant. The increased efficiency of the extinction also allows for smaller and thereby faster electrodes for applying the field.

Depending on the exact purpose and design of the waveguide, the ratio between the contributions from the two means of extinction, absorption and bending losses, may be varied. If the optical signal to be modulated, i.e. the EM radiation of the first frequency, has a frequency below the bandgap frequency of the predetermined material composition (with the applied field), only modulated bending losses will be introduced. If the optical signal to be modulated has a frequency above the bandgap frequency, the modulation in the imaginary part of the refractive index will introduce modulated absorption losses whereas the modulation in the real part of the refractive index will introduce modulated bending losses. Thus, by controlling the material composition and the first frequency, the extinction can be precisely controlled.

Thus, in a first preferred embodiment, the predetermined material composition of the optical active semiconductor material is preferably adjusted so that, for EM radiation of the first frequency, the first complex refractive index, $n_{core\ E1}$ and the second complex refractive index, $n_{core\ E2}$ fulfil the relations:

I. $Re(n_{core\ E1}) > Re(n_{core\ E2})$ giving a first refractive index contrast $\partial n_{E1}$ if the first field is applied and a second refractive index contrast $\partial n_{E2}$ if the second field is applied, the first refractive index contrast being larger than the second refractive index contrast, $\partial n_{E1} > \partial n_{E2}$, II. $Im(n_{core\ E1}) < Im(n_{core\ E2})$, giving a first bandgap frequency larger than the first frequency, $\Theta_{bandgap\ E1} > \Theta_1$, in response to the application of the first field and a second bandgap frequency smaller than the first frequency, $\Theta_{bandgap\ E2} < \Theta_1$, in response to the application of the second field.

In this preferred embodiment, when the first field is applied, the index contrast is high and the first frequency is below bandgap resulting in an efficient, low loss guiding through the bent section and a low absorption. Hence, when the first field is applied, both means of extinction work to give a high transmission through the waveguide section. When the second field is applied, the index contrast is small resulting in large bending losses, and the first frequency is above bandgap resulting in a high absorption. Hence, when the second field is applied, both means of extinction work to give a large extinction in the waveguide section.

This situation is illustrated in FIG. 2 for the case where the applied field is an electric field. In FIG. 2, wherein the predetermined material composition of the optical active semiconductor material is adjusted so as for the first frequency to lie in the shaded region. In FIG. 2, the real and imaginary part of the refractive index of the semiconductor material are given as a function of energy for two different applied fields such as no bias and negative bias corresponding to the first and second field respectively. It can be seen that when the second field is applied, the QCSE shifts the values of $Re(n_{core})$ and $Im(n_{core})$ to values resulting in increased bending losses and absorption. Due to the bending losses, the extinction ratio is enhanced and the amount of photo-generated free charge carriers is reduced, both effects contributing to a more efficient modulation allowing for a reduction in size and voltage swing compared to existing EAMs.

In a second preferred embodiment, the predetermined material composition of the optical active semiconductor material is preferably adjusted so that, for EM radiation of the first frequency, the first complex refractive index, $n_{core\,E1}$ and the second complex refractive index, $n_{core\,E2}$ fulfil the relations:

I. $\text{Re}(n_{core\,E1}) < \text{Re}(n_{core\,E2})$ giving a first refractive index contrast $\ni n_{E1}$ if the first field is applied and a second refractive index contrast $\ni n_{E2}$ if the second field is applied, the first refractive index contrast being smaller than the second refractive index contrast, $\ni n_{E1} < \ni n_{E2}$, II. $\text{Im}(n_{core\,E1})|\text{Im}(n_{core\,E2})$ resulting in a bandgap frequency larger than the first frequency if either of the first or second field is applied, $\Theta_{bandgap\,E1} > \Theta_1$ and $\Theta_{bandgap\,E2} > \Theta_1$.

In the second preferred embodiment, the bending losses give the major contribution to the extinction. When the first field is applied, the index contrast is small resulting in large bending losses, and the first frequency is below bandgap resulting in a low absorption. Hence, the extinction results primarily from the bending losses. When the second field is applied, the index contrast is high resulting in an efficient, low loss guiding through the bent section, and the first frequency is below bandgap resulting in a low absorption. Hence, when the first field is applied, only the bending losses work to give a large extinction, whereas when the second field is applied both effects allows for an efficient low-loss guiding in the waveguide section.

This situation is illustrated in FIG. 3, where the applied field is an electric field. In FIG. 3, the predetermined material composition of the optical active semiconductor material is adjusted so as for the first frequency to lie in the shaded region. It can be seen that when the second field is applied, the QCSE shifts the values of $\text{Re}(n_{core})$ to values resulting in increased bending losses while $\text{Im}(n_{core})$ is very small and do not change significantly. Typically, $\text{Im}(n_{core,E1})$ is slightly smaller than $\text{Im}(n_{core,E2})$ meaning that the absorption is larger when the bending loss is low. Therefore, the predetermined material composition of the optical active semiconductor material is preferably adjusted so as for the absorption to be very low when the second field is applied. Therefore, no photo carriers are generated which could otherwise cause modulation speed limitations due to transport times.

When an optical mode propagates in a bent waveguide section, it is shifted toward the outer perimeter of the bend. Therefore, coupling of different waveguide sections is also a source of losses, coupling losses. It is known, e.g. from Veldhuis et al, that these coupling losses depend on the index contrast of the coupled waveguide sections.

Thus, in a third preferred embodiment the optical modulator further comprises a second waveguide section similar to the first waveguide section and positioned in extension of the first waveguide section, said second waveguide section having a coupling to the first waveguide section which is adapted to introduce coupling losses for radiation in the optical modulator, said coupling losses depending on the refractive index contrast in parts of the sections close to the coupling.

Hence, when modulating the refractive index to modulate the bending losses, the modulator may be designed to benefit from the coupling losses' dependence upon the index contrast. Therefore, the means for applying the first and the second field preferably comprises means for applying the first and the second fields to core regions close to the coupling in the first and/or second waveguide section, so as to modulate the refractive index contrast in these regions.

For all embodiments of the modulator according to the first aspect of the invention, the material composition of the modulator is very important for obtaining the required relations between the complex refractive indices at different applied electric fields. A variety of waveguide designs are applicable, and the design parameters including the material composition may be very precisely determined using existing semiconductor processing technologies. Preferably, the core and/or the surrounding regions are at least substantially formed by one or more of the materials selected from the group consisting of III–V or II–VI semiconductor materials. The II–V material could typically be InP, GaAs, AlGaAs, InGaAsP, whereas a typical II–VI material could be ZnSe.

Depending on the design, it may be necessary to dope one or more material layers, hence the core and/or the cladding region may be doped with one or more of the materials selected from the group consisting of Be, Zn, Mg, Si, C and S.

An optical modulator according to the present invention may advantageously be applied for modulating light signals in order to encode information into the signals. Hence, the means for applying the first and the second electric field preferably comprises one or more electrical contacts for receiving an electric signal and generating the first and second electrical field in response to the received electric signal. The modulator may further comprise ultra fast receivers and amplifiers for receiving the signal. Typically, the received signal will be a binary signal and the means for generating the first and second electrical field is preferably adapted to generate the first field corresponding to "0" and the second field corresponding to "1", or vice versa.

The modulator according to the present invention will preferably be used in optical communication. Hence the material compositions are preferably optimised for providing optimum modulation for light having a wavelength in the region from 500 nm to 2000 nm. Preferably, the modulator is optimised for light having a wavelength in the region 750 nm to 900 nm or 1300 nm to 1650 nm, preferably within smaller regions centered at 850 nm, 1350 nm or 1550 nm.

In the case where the applied field is an electric field, the first applied electric field is preferably at least substantially zero and the second applied electric field is negative. This is because the QCSE typically gives the largest shift for negative bias thereby requiring a smaller voltage swing.

According to a second aspect, the present invention provides a method for modulating EM radiation using the optical modulator according to the first aspect.

DETAILED DESCRIPTION OF THE DRAWINGS

The optical modulator according to the present invention is referred to as a Bent Electro-Absorption Modulator or BEAM. The basic working principle of the BEAM modulator is related to the behaviour of the complex material refractive index of the semiconductor material.

The modification of the refractive index due to a reverse bias as known from QCSE is not only restricted to the imaginary part of the refractive index. Also the real part of the refractive index will be modified. The change of the real part can be calculated from the changes in the imaginary part of the refractive index by the Kramers-Kronig transformation. The real part refractive index changes may result in a modulation of the light field as will be described below.

In general, the QCSE can only change the effective refractive index a small amount (on the order of a few $10^{-3}$). Therefore, the difference between the core and the cladding index in the horizontal direction must also be of the same order of magnitude. Thus, the waveguide type is typically a ridge waveguide or a Buried Heterostructure (BH) waveguide, since both types can be made to weakly guide the light.

As mentioned previously, the complex refractive index may also be modulated optically through the QCSE by mechanisms analogue to the case with electrical fields. Most of embodiments will in the following will be described in relation to the case with electrically induced QCSE, but are equally applicable with optically induced refractive index modulations by induced by photo generated carriers.

Figure 4A:
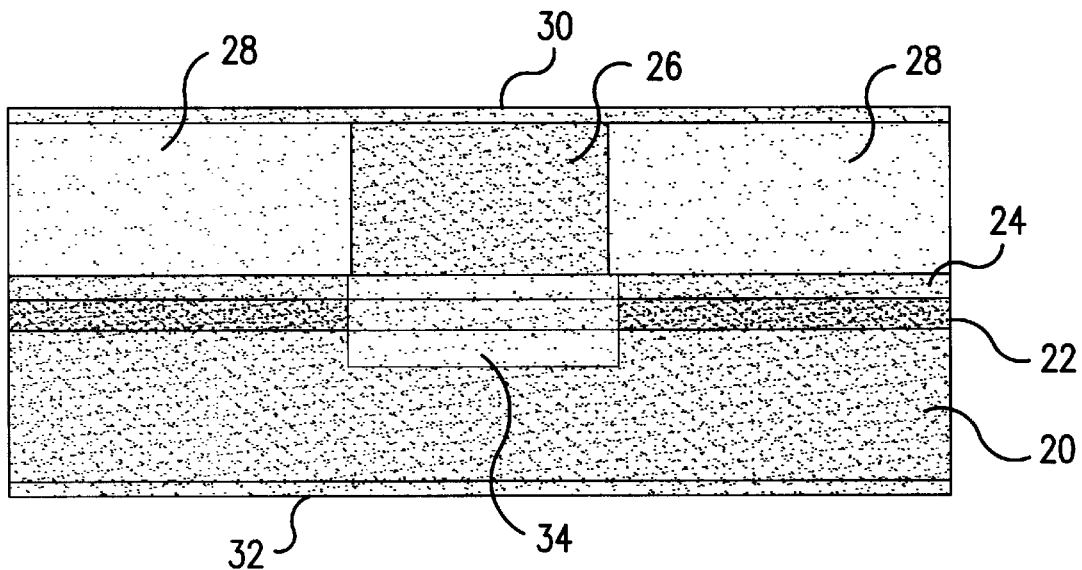
FIGS. 4A and B shows a cross sectional, simplified views of a typical ridge type waveguide.
Figure 4B:
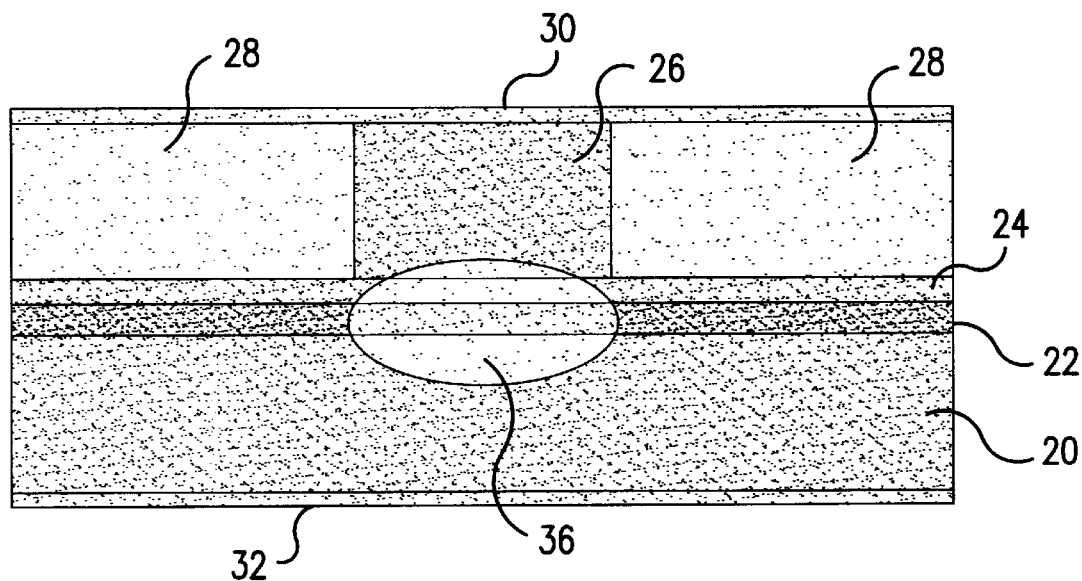

FIG. 4 shows a weakly index guiding ridge waveguide. The shown ridge waveguide consist of a first cladding layer 20, an active layer 22 and a second cladding layer 24. Cladding layers are typically Zn doped InP whereas the active layer typically consist of alternating layers of GalnAsP lattice matched to InP with alternating bandgap depending on composition. The low bandgap layers are named Quantum Wells since they form low energy holes which bind the charged carriers. The effective refractive index for the core layer 22 and cladding layers 20 and 24 are typically 3.216 and 3.204, respectively, and the cladding layers provides a transverse confinement in the waveguide. On top of cladding layer 24 are three regions 28 and the region 26 defining the lateral confinement of the waveguide. The region 26 consists of Zn-doped InP and forms the ridge of the waveguide. The region 28 consists of a planerising polymer with very low optical material absorption and a refractive index significantly below that of region 26. Thus, the different refractive indices in the three regions form the lateral waveguiding. The core region is the area where the refractive index may be modified when applying a reverse bias to the semiconductor using gold electrodes 30 and 32, and is illustrated by the rectangle 34 in FIG. 4A. The waveguide is conducting light, the optical mode 36 will be distributed through the core and cladding layers as illustrated in FIG. 4B.

By changing the real part of the refractive index of the core, the lateral guiding and thus the waveguide loss may be modified. The loss of a waveguide wherein only the lateral optical confinement is modified may be significantly affected by using bent waveguide sections. The bends may be either cosine shaped bends, bends with constant curvature etc. Furthermore, combining the bend with a modulation of the waveguide lateral width will increase the waveguide losses further. Typical waveguide bent designs are shown in FIGS. 5 through 9.

Figure 5:
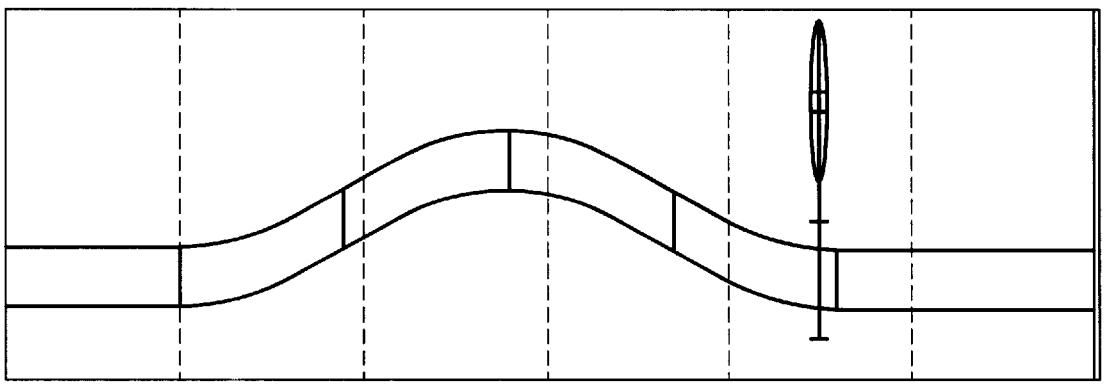
FIGS. 5 to 9 shows a number of different bent waveguide designs having different lengths and offsets and applying a different number of bent waveguide sections having different curvatures.

FIG. 5 shows a waveguide with 6 sections: a straight waveguide, 4 bent waveguides and a straight waveguide section. The vertical line denoted the interface between the sections. The ridge width is typically 2–3 Πm and the off-set at the centre of the bent structure is typically 4–16 Πm. The length of the waveguide is typically 100–400 Πm. Short bends, and thus small area electrical contacts are preferable with respect to high modulation speeds. An extinction ratio typical of at least 8 to 20 dB is possible with an appropriate design and an electric field induced effective refractive index variation of a few $10^{-3}$. The coupling loss between sections can be modified and become more sensitive to refractive index changes by displacing the different sections by a fraction of the waveguide width, typically 1 Πm.

Figure 6:
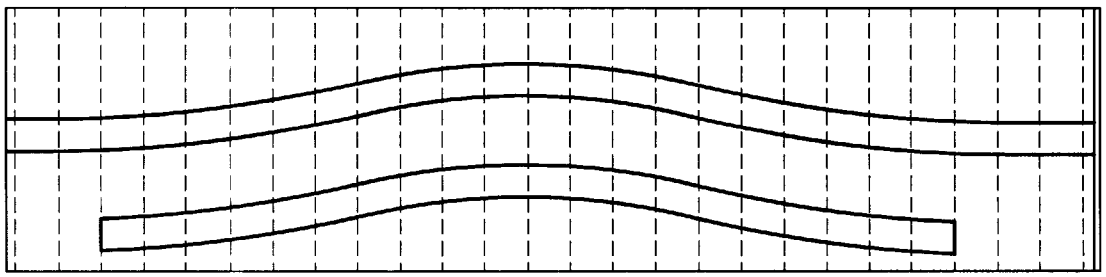

FIG. 6 shows 2 bent waveguides placed close to another. The waveguide below will be able to capture a fraction of the light leaking (bending loss) from the upper waveguide structure. The waveguide thus acts as an aperture, preventing re-capture of the lost or leaked light.

Figure 7:
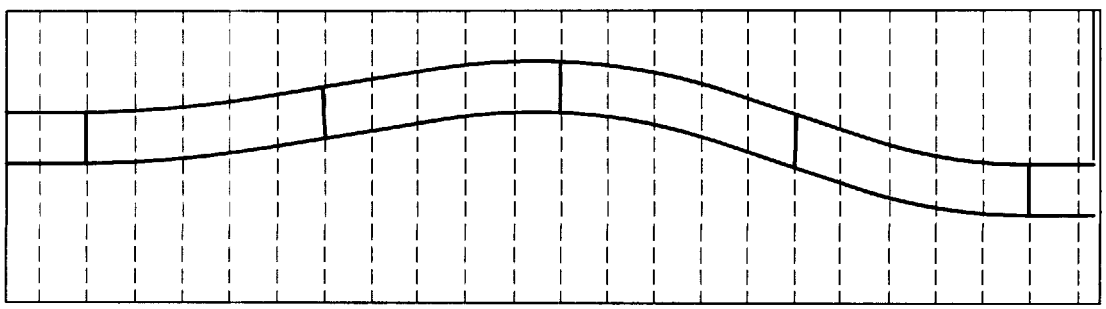

FIG. 7 shows a bent structure where the input and output waveguide sections are laterally displaced, which can be advantageous with respect to avoiding recapture of lost or leaked light.

Figure 8:
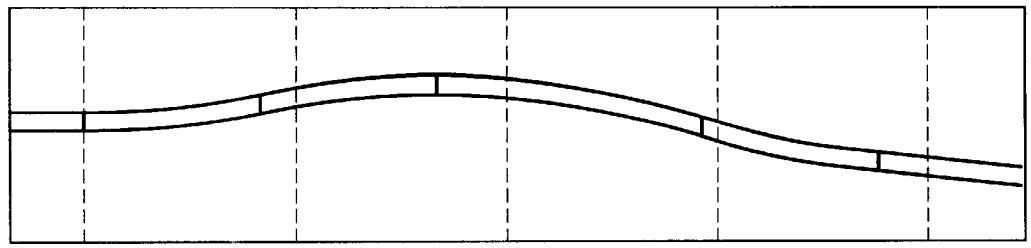

FIG. 8 corresponds to FIG. 7, except that the output waveguide is angled, minimising reflections from the cleaved facets.

Figure 9:
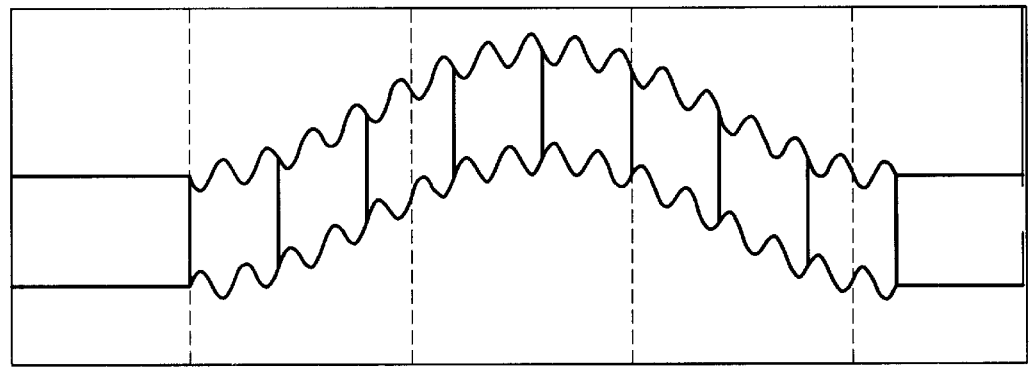

FIG. 9 shows a combination of bent waveguide sections and a modulation of the distance from the centre to the sides of the waveguide. This modulation on either side of the waveguide being either in phase ("wiggle") or out of phase ("wobble"). All these waveguide modifications have effects on the waveguide properties and the sensitivity to the applied field.

Figure 2:
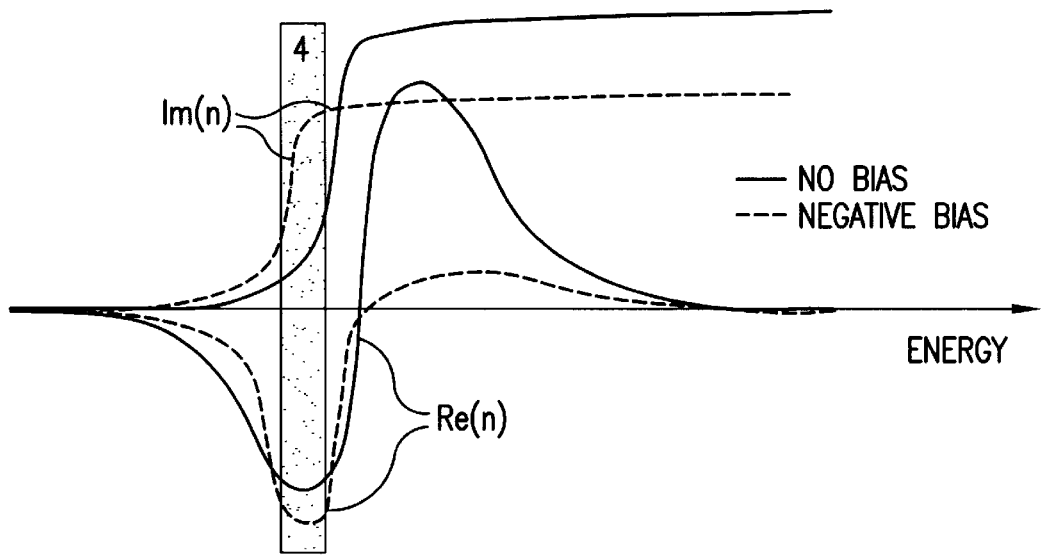
FIGS. 2 and 3 shows the real and imaginary part of the refractive index of an optical active semiconductor material as a function of energy for two different applied fields. The shaded regions indicate the preferred frequencies of the radiation to be modulated.
Figure 3:
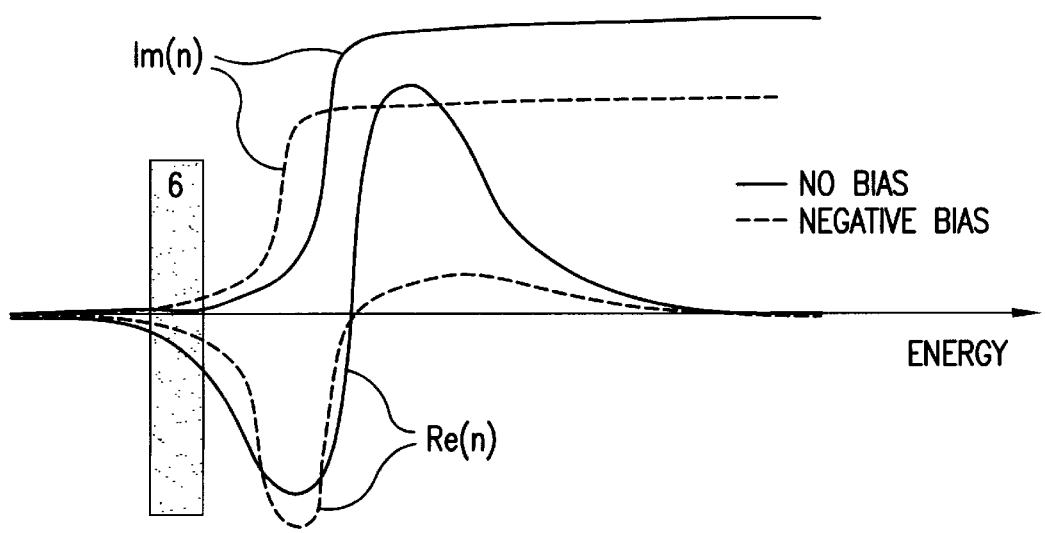

Spectrally, there are two working regions for the BEAM, marked by the shaded regions in FIGS. 2 and 3. The shaded regions indicate the preferred frequencies of the radiation to be modulated.

In the first working region 4, shown in FIG. 2, the operation point is above-bandgap. In this case the bent waveguide section will work like an ordinary EAM, but in a particular wavelength region the working principle of the EAM will be improved, since the bend-losses enhance the modulation response. In FIG. 2 the shaded region 4 denotes a region where the absorption is low when no bias is applied. Simultaneously the index of the core is high resulting in low bending losses. Increasing the reverse bias the QCSE shifts the absorption spectra to lower energies resulting in a high absorption. The refractive index of the core region decreases with reverse bias, resulting in larger bend-losses. The modulator works in this case both as an EAM and as a bent waveguide modulator.

In the second working region 6, shown in FIG. 3, the working point is below bandgap and the waveguide structure may be transparent (zero or low absorption). In case no bias is applied the solid curve has a low refractive index and the waveguide will have a high bend-loss. Increasing the reverse bias will result in an increase of the core effective index and thus a reduction of the bend-losses. A small increase in absorption may also be observed due to the QCSE, but this may be minimised by a proper design of the semiconductor structure.

There are a number of key material and design parameters to consider when designing a BEAM modulator, most of which are relevant for a BEAM working in either of the regions 4 and 6 of FIGS. 2 and 3 respectively. These will be described in the following.

The sensitivity of the material to the applied electric field and thus the resulting shifts in both the real and imaginary part of the refractive index as a function of applied electric fields depend on several epitaxial growth related issues, such as quantum well material composition, energy depth of wells, well widths, distance between p and n-doped layers, etc. By designing the epitaxial, active core material to have a large refractive index change as a function of electric field, a number of restrictions in design can be relaxed. For example, the waveguide can be designed to be less sensitive to refractive index changes and thus be less sensitive to fabrication variations. Also, by optimising the electric field sensitivity of the material, the extinction ratio can be optimised and the demands for the magnitude of the applied field can be relaxed.

The refractive index contrast between the core and cladding regions must be tuned to a value appropriate to the corresponding shift of the real part of the refractive index of the core region. If the index contrast is too small, the resulting guiding will not be sufficient to keep the light from leaking to the surroundings. Also the fabrication tolerances will be tight. If, on the other hand, the index contrast is too large, the index changes due to the applied electric field will not be sufficient to significantly alter the guiding.

The sensitivity of the efficiency of the guiding depends on the mode size and thus on the cross sectional dimensions of the core region. Hence, the width and height of the waveguide have a large effect of the losses in the bent waveguide sections as well as in couplings. By designing the waveguide to have local variations in the cross sectional shape, such as to "wiggle" or "wobble" as shown in FIG. 9, certain desirable guiding features may be optimised.

The curvature of the waveguide naturally needs to be such that there is some leakage which may be modulated by the applied field. The curvature may, as previously mentioned, be constant, or vary according to some function. Typically, the bend will comprise a number of smaller bent waveguide sections, which may have different curvatures and bending directions. Hence the curvature of the waveguide may be very complex. Calculations have shown that the way in which each section is interfaced to the next may have a large effect on the guiding properties, thus the coupling between sections is an important design parameter as well.

The length of each waveguide section will have a large effect on the amount of transmitted light, since the total bending losses and absorption depends upon how long a path the radiation has experienced these effects. Hence, the length of the waveguide will have a large effect on the amount of transmitted light both in the "on" and "off" state since there is always some bending losses and absorption, even in the "off" state. Light which has been lost or leaked may be recaptured in the waveguide since the waveguide may bend back into the path of the lost or leaked light. The angle between waveguide and output facet is another design variable which may be optimised to minimise recapture of light.

Some further material and design parameters are only relevant for a BEAM working in either of the region 4 of FIG. 2, in which absorption is important.

In some cases it may be advantageous to maximise the ratio between material absorption at the two applied electrical fields in order to maximise the extinction ratio. In other cases, it is more important to balance the absorption and bending losses in order to maximise device speed.

Clearly, high transmission is important for the "on" state in order to minimise insertion losses. Thus, in the "on" state of the device, the material absorption may be made as low as possible without jeopardising the material absorption in the "off" state.

A sample of a BEAM has been realised for testing the working principle of the present invention. Our test devices were made of III–V material, InGaAsP, which were lattice matched to InP. The active region comprised of 10 quantum wells, which had a band gap such that the photoluminescence peaked around 1555–1557 nm. The waveguides were of the ridge waveguide type, where the effective refractive index of the core and cladding was estimated to be 3.216 and 3.204, respectively.

The test devices comprised of 3 sets of devices, each set comprising of 8 devices with different curvatures for the bent sections. Each device comprised of two sections, a straight waveguide and a curved waveguide such that the total waveguide length was approximately the same for all the devices. For each device the bent section had a different curvature. In all cases, the length and width of the waveguide was 1 mm and 3 Πm, respectively and the offset was 65 Πm. The curvature was determined by the length of the curved section, which varied between 500 Πm and 1000 Πm in steps of 100 Πm.

The devices were fitted with electrical contacts above and below the waveguide, which made it possible to apply a negative electric field across the active region (across the quantum wells). The devices were then mounted to a copper heat sink for temperature control.

In testing the devices, the light from a laser was coupled into one device at the time and the transmission of this light as a function of the magnitude of the reverse bias was measured. The wavelength of the laser light was 1593 nm, which meant that both coupling losses as well as absorption were present (energy region 2). By comparing the performance of the bent devices with the straight it was possible to subtract the contribution from the absorption and thus being able to assess how the light propagation through the bent sections was affected by the change of the refractive index. When using a bent waveguide for modulation purposes at typical communication frequencies, the length of the waveguide would most often be much shorter than for the test device, typically of the order of 100–200 Πm, in order to increase device speed. Also, a number of the other features discussed under the material and design key parameters would be introduced.

Figure 10:
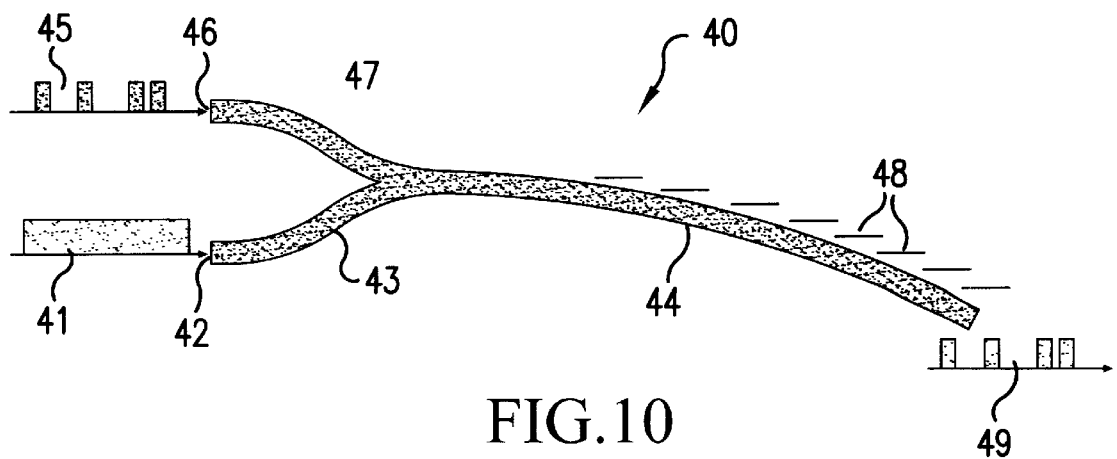
FIG. 10 is a top view of an illustration of a bent waveguide modulator according to a preferred embodiment of the present invention, wherein the modulation is controlled by an intensity modulated optical signal.

FIG. 10 illustrates another preferred embodiment of the present invention, namely an optical modulator 40 using optically induced QCSE. The modulator 40 comprises an input port 42 for receiving an EM signal 41 to be modulated having a first frequency $\Theta_1$. From the input port 42, the signal 41 is guided by a waveguide section 43 to the bent waveguide section 44. The modulator further comprises an input port 46 for receiving a modulating signal 45 having a frequency $\Theta_2$. The signal 45 is guided by a waveguide section 47 to the bent waveguide section 44. Sections 43 and 47 together establishes a coupler for superposing the signals 41 and 45 in the bent waveguide section 44. The modulating signal 45 modulates the complex refractive index, $Re(n_{core})$ and $Im(n_{core})$, of the optical active semiconductor material core of the bent waveguide section 44.

The modulation in $Re(n_{core})$ results in a modulation in the index contrast between the core material of the bent waveguide section and the typically constant refractive index of the surrounding material. Since the bending losses for the signal 41 depends on the index contrast, modulated bending losses 48 is induced in signal 41 if signals 45 and 41 overlaps temporarily. As a result, a resulting, modulated signal 49 has the same shape as the modulating signal 45 but the frequency $\Theta_1$ of the signal 41.

The modulation in $Im(n_{core})$ may, depending on which of the scenarios described in relation to FIGS. 2 and 3 is chosen, result in a modulation of the absorption of the signal 41 in the core material of the bent waveguide section 44. Thereby, radiation guided by the bent waveguide section 44 despite the bending loss may be absorbed. This combined extinction, bending losses and absorption, improve the extinction ratio and/or the modulation depth of the resulting signal 49.

The BEAM has a large number of potential applications, some of which are listed below.

1. Modulation in general. The BEAM may be used to directly modulate light. For very high speed modulation, it could be advantageous to operate in regime 1, where no material absorption takes place. In that case no carriers have to be removed from the active region to avoid a pile-up effect that will reduce the applied voltage. The modulation could for example be a high bitrate bitstream.
2. Time-demultiplexing of OTDM channel. By keeping the BEAM in the "off" state expect for short "window openings" at a specific frequency, the BEAM may be used to multiplex out one time slot in an Optical Time Division Multiplexed (OTDM) bitstream.
3. Cross Phase Modulation for wavelength conversion. One may change the refractive index through EM radiation as well as an applied electric field. By coupling a modulated, high intensity pumping light with a photon energy above bandgap through the BEAM, material absorption takes place. The generated carriers will change the refractive index and thus the guiding properties. By simultaneously incoupling light with a photon energy below bandgap, the change in guiding properties will modulate the light in a pattern being either the same or the inverse of the pattern of the pump light.
4. Clock generation. By simply applying a voltage which is sinusoidal as a function of time, the BEAM may generate an optical signal which may be used as an optical clock for communication systems.
5. Part of multiplexing system, where the multiplexing is done electrically. As in 1. the BEAM could be used in a system which as input has several electrical signals and as output has one single optical signal. The electrical signals will be multiplexed together electrically and the fast, multiplexed signal is applied to the BEAM and used to modulate light.
6. Part of signal regeneration system. As part of a signal regeneration system, electronics will detect, reshape and amplify the incoming signal and apply the resulting voltage to the BEAM so that the output light is an improved copy on the input.
7. All-optical demultiplexing. As in 2. the BEAM could be kept in the "off" state expect for short "window openings" at a specific frequency were an optical control pulse is injected above bandgap to create a change in the effective refractive index below bandgap as described in 3.

In all the above examples, the BEAM may be used to replace traditional EAs where very high speed or better extinction ratios are needed. Since there is reduced or no material absorption involved in the modulation process, high speed limitations related to carrier transport have been removed/reduced.

What is claimed is:

1. An optical modulator for modulating electromagnetic (EM) radiation having a first frequency $\Theta_1$, said optical modulator comprising a first waveguide section for guiding the EM radiation, said waveguide section comprising an elongated core region with complex refractive index $n_{core}$ having side walls to a surrounding region with complex refractive index $n_{surr}$, the difference between the real part of $n_{core}$ and the real part of $n_{surr}$ defining a refractive index contrast $\partial n = Re(n_{core}) - Re(n_{surr})$ and at least one of the side walls of the core region being in the longitudinal direction of the core region, and comprising means for applying a modulated first and second electric or EM field $E_1$ and $E_2$ to the core region, wherein the core region comprises an optical active semiconducting material having a predetermined material composition and having an energy bandgap, said energy bandgap being positioned at a first bandgap frequency $\Theta_{bandgap\,E1}$ in response to the application of the first field and being positioned at a second bandgap frequency $\Theta_{bandgap\,E2}$ in response to the application of the second field, $n_{core}$ depending upon the energy bandgap so that the material composition provides, for EM radiation of the first frequency, a first complex refractive index $n_{core\,E1}$ in response to the application of the first field and a second complex refractive index $n_{core\,E2}$ in response to the application of the second field, and wherein the predetermined material composition and the first frequency are chosen so that a difference in the index contrasts $\partial n_{E1} = Re(n_{core\,E1}) - Re(n_{surr})$ and $\partial n_{E2} = Re(n_{core\,E2}) - Re(n_{surr})$ results in bending losses for EM radiation of the first frequency guided in the waveguide.

2. An optical modulator according to claim 1, wherein the means for applying the first and second fields comprises one or more electrical contacts for receiving an electric signal.

3. An optical modulator according to claim 1, wherein the means for applying the first and second fields comprises one or more optical input ports for receiving an EM signal having second frequency and means for guiding said signals to the core region, and wherein the optical active semiconducting material absorbs EM radiation of the second frequency.

4. An optical modulator according to claim 1, wherein the core and/or the surrounding region are at least substantially formed by one or more materials selected from the group consisting of III–V and II–VI semiconductor materials.

5. An optical modulator according to claim 4, wherein the core and/or the cladding region is doped with one or more of the materials selected from the group consisting of Be, Zn, Mg, Si, C and S.

6. An optical modulator according to claim 1, further comprising a second waveguide section in extension of the first waveguide section, said second waveguide section having a coupling to the first waveguide section which is adapted to introduce coupling losses for radiation in the optical modulator, said coupling losses depending on the refractive index contrast in core regions adjacent to the coupling.

7. An optical modulator according to claim 6, wherein the means for applying the first and the second field comprises means for applying the first and the second fields to core regions close to the coupling in the first and/or second waveguide section, so as to modulate the refractive index contrast in these regions.

8. An optical modulator according to claim 1, wherein the first applied field is at least substantially zero.

9. An optical modulator according to claim 1, wherein the predetermined material composition of the optical active semiconductor material is adjusted so that, for EM radiation of the first frequency, the first complex refractive index, $n_{core\,E1}$ and the second complex refractive index, $n_{core\,E2}$ fulfil the relations:

I. $Re(n_{core\,E1}) > Re(n_{core\,E2})$ giving a first refractive index contrast $\partial n_{E1}$ if the first field is applied and a second refractive index contrast $\partial n_{E2}$ if the second field is applied, the first refractive index contrast being larger than the second refractive index contrast, $\partial n_{E1} > \partial n_{E2}$, II. $\text{Im}(n_{core\ E1}) < \text{Im}(n_{core\ E2})$, giving a first bandgap frequency larger than the first frequency, $\Theta_{bandgap\ E1} > \Theta_1$, in response to the application of the first field and a second bandgap frequency smaller than the first frequency, $\Theta_{bandgap\ E2} < \Theta_1$, in response to the application of the second field.

10. An optical modulator according to claim 1, wherein the predetermined material composition of the optical active semiconductor material is adjusted so that, for EM radiation of the first frequency, the first complex refractive index, $n_{core\ E1}$ and the second complex refractive index, $n_{core\ E2}$ fulfil the relations:

I. $\text{Re}(n_{core\ E1}) < \text{Re}(n_{core\ E2})$ giving a first refractive index contrast $\partial n_{E1}$ if the first field is applied and a second refractive index contrast $\partial n_{E2}$ if the second field is applied, the first refractive index contrast being smaller than the second refractive index contrast, $\partial n_{E1} < \partial n_{E2}$, II. $\text{Im}(n_{core\ E1}) | \text{Im}(n_{core\ E2})$ resulting in a bandgap frequency larger than the first frequency if either of the first or second field is applied, $\Theta_{bandgap\ E1} > \Theta_1$ and $\Theta_{bandgap\ E2} > \Theta_1$.

11. An optical modulator according to claim 1, wherein the waveguide section is adapted to introduce bending losses in that the waveguide section is a bent waveguide section.

12. An optical modulator according to claim 11, wherein the waveguide section is adapted to introduce bending losses in that the waveguide section comprises two or more small bends.

13. An optical modulator according to claim 1, wherein the waveguide section is adapted to introduce bending losses in that the width of the waveguide section is varied.

14. An optical modulator according to claim 1, wherein the first frequency of EM radiation to be modulated has a wavelength within the region from 500 nm to 2000 nm, such as within the region 750 nm to 900 nm or 1300 nm to 1650 nm.

15. An optical modulator according to claim 1, wherein the first frequency of EM radiation to be modulated has a wavelength within an interval centered at 850 nm, 1350 nm or 1550 nm, said interval having a width of 50 nm.

16. A method for modulating EM radiation using the optical modulator according to claim 1.

* * * * *

UNITED STATES PATENT AND TRADEMARK OFFICE
CERTIFICATE OF CORRECTION

PATENT NO.    : 6,512,860 B2
DATED         : January 28, 2003
INVENTOR(S)   : Bischoff, Svend et al.

Figure 1:
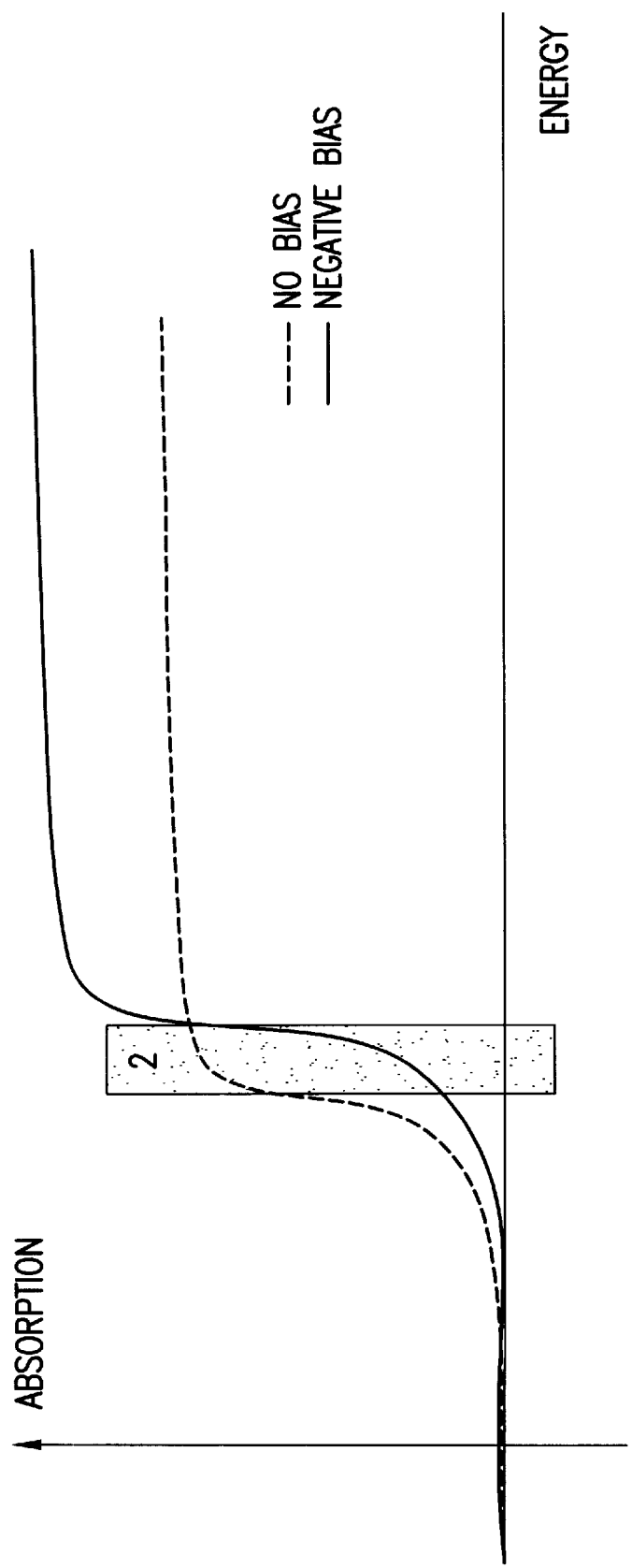
FIG. 1 shows the shift of the absorption bandgap for an optical active semiconductor due to the QCSE.

It is certified that error appears in the above-identified patent and that said Letters Patent is hereby corrected as shown below:

Drawings,
Fig. 1, the line types showing "No Bias" and "Negative Bias" have been inadvertently reversed in the legend. "No Bias" is now shown by a solid line and "Negative Bias" is now shown by a dotted line, as shown below:

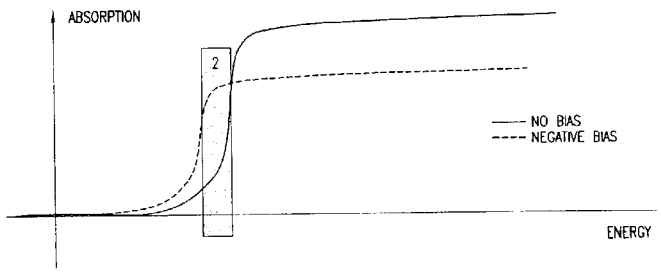

FIG. 1
PRIOR ART

Column 2,
Line 9, change "∂n" to -- $\Delta n$ --.
Lines 46-48, change "$T! \sin^{-1}\left(\frac{n_2}{n_1}\right)$" with -- $-\theta > \sin^{-1}\left(\frac{n_2}{n_1}\right)$ --

Column 3,
Line 37, change "∂V" to -- $\Delta V$ --.
Line 55, change "$\Theta_1$" to -- $v_1$ --.
Line 62, change "∂n" to -- $\Delta n$ --.

Column 4,
Lines 3 and 5, change "$\Theta$" to -- $v$ --.
Lines 13-14, change "∂$n_{E1}$ = Re($n_{core}$ E1) - Re(n)$_{surr}$ and ∂$n_{E2}$ = Re($n_{core}$E2) - Re($n_{surr}$)" to -- $\Delta n_{E1}$ = Re($n_{core\ E1}$) - Re($n_{surr}$) and $\Delta n_{E2}$ = Re($n_{core\ E2}$) - Re($n_{surr}$) --.
Line 51, change "the.circuit" to -- the circuit --.

Column 5,
Line 37, change "$\Theta$" to -- $v$ --.

Column 6,
Line 27, change "∂$n_{E1}$" to -- $\Delta n_{E1}$ --.
Line 28, change "∂$n_{E2}$" to -- $\Delta n_{E2}$ --.
Line 30, change "∂$n_{E1}$ > ∂$n_{E2}$" to -- $\Delta n_{E2}$ > $\Delta n_{E2}$ --
Line 31, change "Im($n_{core}$ E1)" to -- Im($n_{core\ E1}$) --.
Line 32-33, change "$\Theta_{bandgap,\ E1}$ > $\Theta_1$" to -- $v_{bandgap,\ E1}$ > $v_1$ --
Line 35, change "$\Theta_{bandgap,\ E2}$ < $\Theta_1$" to -- $v_{bandgap,\ E2}$ < $v_1$ --.

UNITED STATES PATENT AND TRADEMARK OFFICE
CERTIFICATE OF CORRECTION

PATENT NO. : 6,512,860 B2
DATED : January 28, 2003
INVENTOR(S) : Bischoff, Svend et al.

It is certified that error appears in the above-identified patent and that said Letters Patent is hereby corrected as shown below:

Column 7,
Line 5, change "$\partial n_{E1}$" to -- $\Delta n_{E1}$ --
Line 6, change "$\partial n_{E2}$" to -- $\Delta n_{E2}$ --.
Line 8, change "$\partial n_{E1} < \partial n_{E2}$" to -- $\Delta n_{E2} < \Delta n_{E2}$ --.
Line 9, change "Im($n_{core}$ E1)|" to -- Im($n_{core\ E1}$) $\approx$ --.
Lines 11 and 12, "$\Theta_{bandgap,\ E2} < \Theta_1$" to -- $\nu_{bandgap,\ E2} < \nu_1$ --.

Column 9,
Line 67, change "Πm" to -- $\mu$m --.

Column 10,
Lines 1, 2 and 10, change "Πm" to -- $\mu$m --.

Column 12,
Lines 15, 16, 18 and 38, "Πm" to -- $\mu$m --.
Line 19, "Πm in steps of 100 Πm" to -- $\mu$m in steps of 100 $\mu$m --.
Lines 46, 50 and 65, "$\Theta$" to -- $\nu$ --.

Column 13,
Line 62, change "$\Theta_1$" to -- $\nu_1$ --.

Column 14,
Line 2, change "$\partial n$" to -- $\Delta n$ --.
Lines 10 and 12, change "$\Theta$" to -- $\nu$ --.
Lines 19-20, change ""$\partial n_{E1}$ = Re($n_{core}$ E1) - Re($n_{surr}$) and $\partial n_{E2}$ = Re($n_{core}$E2) - Re($n_{surr}$)" to -- $\Delta n_{E1}$ = Re($n_{core\ E1}$) - Re($n_{surr}$) and $\Delta n_{E2}$ = Re($n_{core\ E2}$) - Re($n_{surr}$) --.
Line 64, change "$\partial n_{E1}$" to -- $\Delta n_{E1}$ --.
Line 65, change "$\partial n_{E2}$" to -- $\Delta n_{E2}$ --.
Line 67, change "$\partial n_{E1} > \partial n_{E2}$" to -- $\Delta n_{E2} > \Delta n_{E2}$ --

Column 15,
Line 1, change "Im($n_{core}$ E1)" to -- Im($n_{core\ E1}$) --.
Lines 2-3, change "$\Theta_{bandgap,\ E1} > \Theta_1$" to -- $\nu_{bandgap,\ E1} > \nu_1$ --
Line 5, change "$\Theta_{bandgap,\ E1} > \Theta_1$" to -- $\nu_{bandgap,\ E1} > \nu_1$ --
Line 14, change "$\partial n_{E1}$" to -- $\Delta n_{E1}$ --

UNITED STATES PATENT AND TRADEMARK OFFICE
CERTIFICATE OF CORRECTION

PATENT NO. : 6,512,860 B2
DATED : January 28, 2003
INVENTOR(S) : Bischoff, Svend et al.

It is certified that error appears in the above-identified patent and that said Letters Patent is hereby corrected as shown below:

<u>Column 15 cont'd,</u>
Line 15, change "$\partial n_{E2}$" to -- $\Delta n_{E2}$ --
Line 17, change "$\partial n_{E1} < \partial n_{E2}$" to -- $\Delta n_{E1} < \Delta n_{E2}$ --
Line 18, change "$Im(n_{core} E1)|$" to -- $Im(n_{core\ E1}) \approx$ --
Lines 20 and 21, change "$\Theta_{bandgap,\ E1} > \Theta_1$" to -- $v_{bandgap,\ E1} > v_1$ --.

Signed and Sealed this

Twenty-eighth Day of October, 2003

JAMES E. ROGAN
*Director of the United States Patent and Trademark Office*